Dec. 7, 1965  F. W. CURTIS  3,222,241
VAPOR BARRIER AND ADHESIVE APPLICATORS
Original Filed July 18, 1960  10 Sheets-Sheet 1

INVENTOR.
FRANK W. CURTIS
BY
ATTORNEYS

INVENTOR.
FRANK W. CURTIS

Dec. 7, 1965     F. W. CURTIS     3,222,241
VAPOR BARRIER AND ADHESIVE APPLICATORS
Original Filed July 18, 1960     10 Sheets-Sheet 3

INVENTOR.
FRANK W. CURTIS
BY
Meyer, Baldwin, Doran & Egan
ATTORNEYS

Dec. 7, 1965  F. W. CURTIS  3,222,241
VAPOR BARRIER AND ADHESIVE APPLICATORS
Original Filed July 18, 1960  10 Sheets-Sheet 4

INVENTOR.
FRANK W. CURTIS
BY
ATTORNEYS

Dec. 7, 1965   F. W. CURTIS   3,222,241
VAPOR BARRIER AND ADHESIVE APPLICATORS
Original Filed July 18, 1960   10 Sheets-Sheet 5
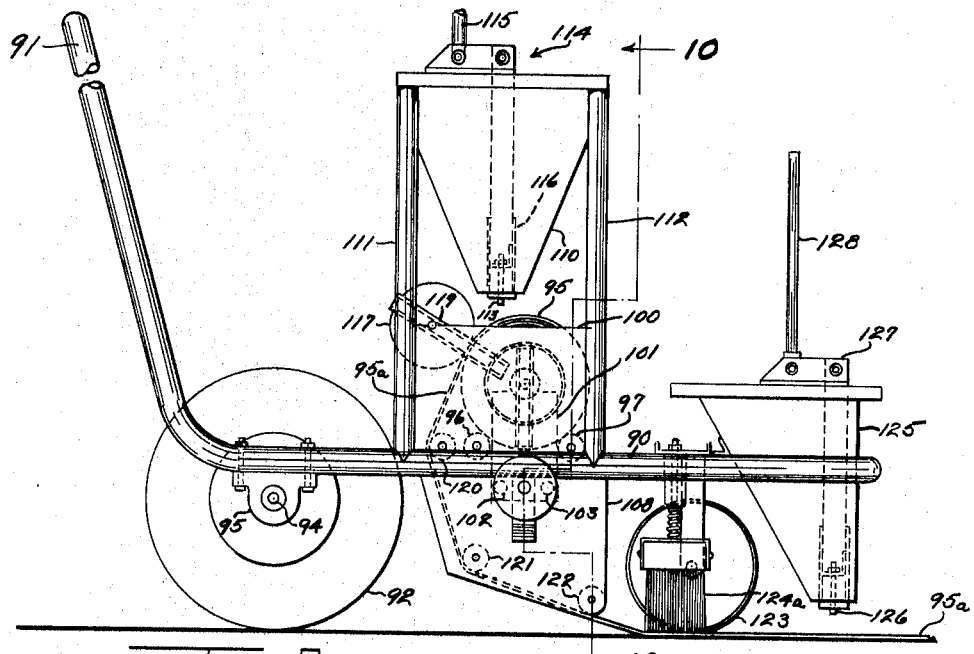
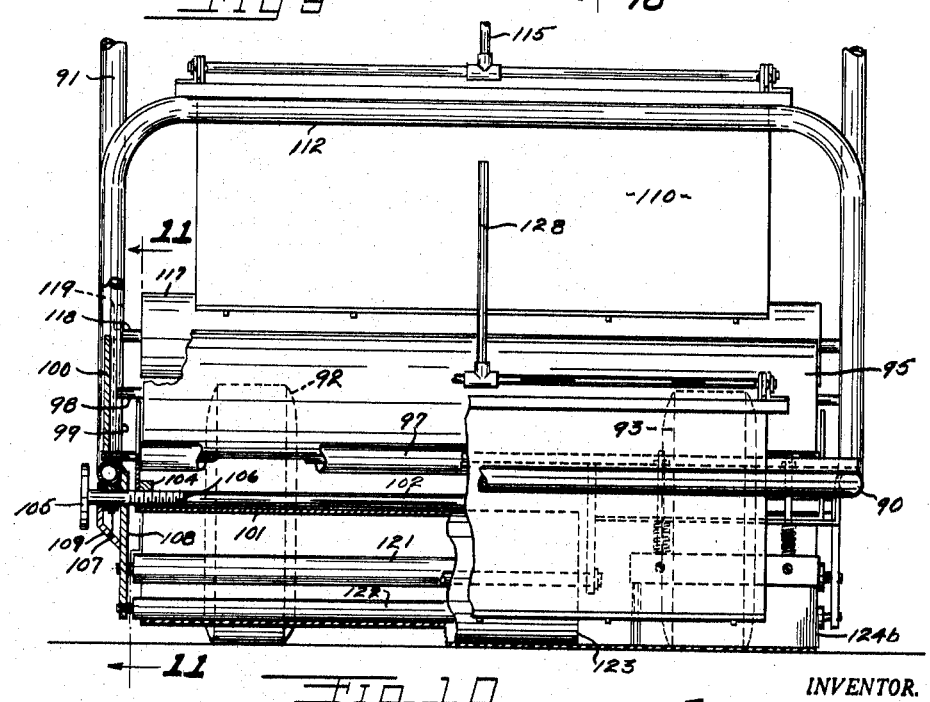
INVENTOR.
FRANK W. CURTIS
BY
Meyer, Baldwin, Doan & Egan
ATTORNEYS Dec. 7, 1965  F. W. CURTIS  3,222,241
VAPOR BARRIER AND ADHESIVE APPLICATORS
Original Filed July 18, 1960  10 Sheets-Sheet 6

INVENTOR.
FRANK W. CURTIS
BY
ATTORNEYS

Dec. 7, 1965  F. W. CURTIS  3,222,241
VAPOR BARRIER AND ADHESIVE APPLICATORS
Original Filed July 18, 1960  10 Sheets-Sheet 7

INVENTOR.
FRANK W. CURTIS
BY
Mega, Baldwin, Doan & Egan
ATTORNEYS

Dec. 7, 1965  F. W. CURTIS  3,222,241
VAPOR BARRIER AND ADHESIVE APPLICATORS
Original Filed July 18, 1960  10 Sheets-Sheet 8

INVENTOR.
FRANK W. CURTIS
BY
Meyer, Baldwin, Doan & Egan
ATTORNEYS

Dec. 7, 1965    F. W. CURTIS    3,222,241
VAPOR BARRIER AND ADHESIVE APPLICATORS
Original Filed July 18, 1960    10 Sheets-Sheet 9

INVENTOR.
FRANK W. CURTIS
BY
Meyer, Baldwin, Doran & Egan
ATTORNEYS

Dec. 7, 1965  F. W. CURTIS  3,222,241
VAPOR BARRIER AND ADHESIVE APPLICATORS
Original Filed July 18, 1960  10 Sheets-Sheet 10

INVENTOR.
FRANK W. CURTIS
BY
Mayer, Baldwin, Doran & Egan
ATTORNEYS

United States Patent Office 3,222,241
Patented Dec. 7, 1965

3,222,241
VAPOR BARRIER AND ADHESIVE APPLICATORS
Frank W. Curtis, Chagrin Falls, Ohio, assignor to Lexsuco, Incorporated, Solon, Ohio, a corporation of Ohio
Original application July 18, 1960, Ser. No. 43,614, now Patent No. 3,183,139, dated May 11, 1965. Divided and this application Dec. 8, 1964, Ser. No. 416,775
1 Claim. (Cl. 156—575)

This application is a division of my pending United States patent application Serial No. 43,614 filed July 18, 1960 now Patent No. 3,183,139 which in turn is a continuation-in-part of my United States patent application Serial No. 619,163 filed October 30, 1956 and now abandoned.

This invention relates to roof surfacing apparatus and more particularly to surfacing apparatus for applying roofing sheet material and suitable adhesives for bonding said sheet material to the surface to be covered.

An object of the present invention is to provide surfacing apparatus for applying vapor barrier sheet material to a roof surface while simultaneously applying suitable adhesive material to the sheet material to effect a good bond between the sheet material and the roof surface.

Another object of the present invention is to provide surfacing apparatus for applying vapor barrier sheet material to a roof surface which includes means for supporting a roll of vapor barrier sheet material, means forming an adhesive reservoir, means for guiding said sheet material as it is being applied, means for transferring the adhesive contained in said reservoir means to one or both surfaces of said sheet material and means for applying a uniform pressure on said sheet material to effect a good bond between said sheet material and said roof surface.

Still another object of the present invention is to provide novel apparatus which may be used for applying adhesive materials to vapor barrier sheet materials used in connection with roof surfaces, and also for applying adhesive materials directly to the roof surface if such function be desired.

Another object of the present invention is to provide surfacing apparatus for applying vapor barrier sheet material and suitable adhesive material characterized by its structural simplicity, the ease of assembly of its parts, its strong and sturdy nature and its low manufacturing cost. Other features of this invention reside in the arrangement and design of the parts for carrying out their appropriate functions.

Further objects of the present invention and certain practical advantages will be referred to in or will be evident from the following description of five embodiments of the invention as illustrated in the accompanying drawings in which:

FIG. 3 is a vertical cross sectional view taken along the plane of line 3—3 of FIG. 1 and having parts broken away to more clearly show the construction;

FIG. 6 is a vertical cross sectional view taken along the plane of line 6—6 of FIG. 1;

FIG. 9 is a side elevational view of another embodiment of the present invention;

FIG. 10 is a vertical cross sectional view taken along the plane of line 10—10 of FIG. 9 with parts cut away to more clearly show the construction;

Before describing in detail and herein disclosed embodiments of the invention, it is to be understood that the present invention is not limited to the structural deails or the particular arrangement of parts herein shown, as devices embodying the present invention may take other forms. It also is to be understood that the phraseology and terminology herein used are for purposes of description and not of limitation, as the scope of the present invention is denoted by the appended claims.

Figure 1:
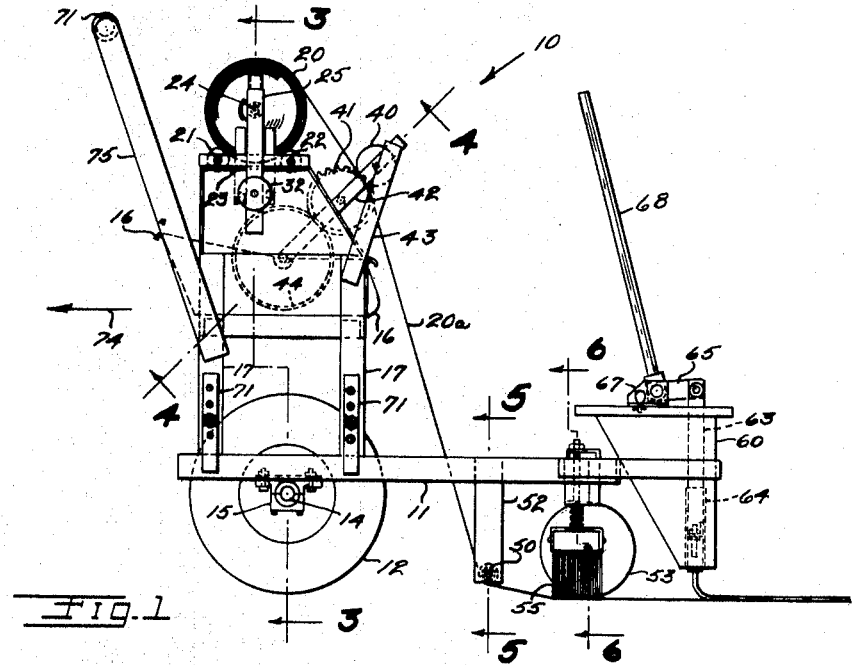
FIG. 1 is a side elevational view of one embodiment of the present invention.

Referring now to FIGS. 1 through 7 wherein I have shown one embodiment of a novel vapor barrier sheet material and adhesive applicator 10. The applicator consists of a substantially horizontal rectangular base frame member 11 which is mounted for movement on a pair of wheels 12 and 13 adjacent the front of the apparatus which are mounted for rotation on axle 14 which has its distal ends journaled in bearing boxes 15 which are secured to the side members of the frame 11, as seen in FIGS. 1 and 3. A tray 16 forming an adhesive reservoir is rigidly secured between pairs of spaced vertically upright frame members 17 and 18 located on each side of the apparatus. The tray is secured at its base portion to the members 17 and 18 by means of angle irons 19, as seen in FIG. 6. A roll of vapor barrier sheet material 20 such as Koroseal, the trade name of a product manufactured by the B. F. Goodrich Company, is supported at the top of the machine by means of a pair of spaced rollers 21 and 22. The rollers 21 and 22 are supported for rotation between spaced plate-like frame members 23 which are connected to the pairs of vertically upright members 17 and 18. The roll of vapor barrier sheet material 20 is mounted for rotation on a suitable axle 24 which in turn has its distal ends retained within a pair of spaced U-shaped guide members 25 which permit the axle 24 to rotate but prevents it and its associated roll of vapor barrier sheet material from horizontal displacement. It will be noted, however, that the U-shaped guide members 25 permit the axle 24 to move vertically downward as the roll of vapor barrier sheet material becomes smaller, as it is fed out across the roof surface. The U-shaped guide members 25 are rigidly secured to the frame members 23 intermediate the spaced rollers 21 and 22.

Means is provided for laterally aligning the roll of vapor barrier sheet material 20. Such means take the form of a substantially U-shaped member 28 having a base portion with a length somewhat greater than the overall length of the vapor barrier roll 20 and a pair of spaced upstanding leg portions 28a and 28b which extend upwardly adjacent the ends of the roll 20. The member 28 is supported for sliding in lateral movement along a pair of spaced bars 29 and 30, each of which is rigidly secured to the frame member 23. As seen in FIG. 3, the portion 28a is provided with a threaded nut 31 which is secured at one end thereof. A control knob 32 having a threaded shaft 33 is adapted to threadedly engage the nut 31. The shaft 33 is provided with an annular flange member 34 which is secured to said shaft by means of an adjustable set screw. Flange member 34 is captured in an open space provided between frame members 35 and 23 and prevents the adjusting knob and its associated shaft from axial movement. Thus, as the control knob 32 is rotated, it causes the member 28 to travel back and forth along the spaced bars 29 and 30, and in turn laterally adjusts roll 20.

Figure 2:
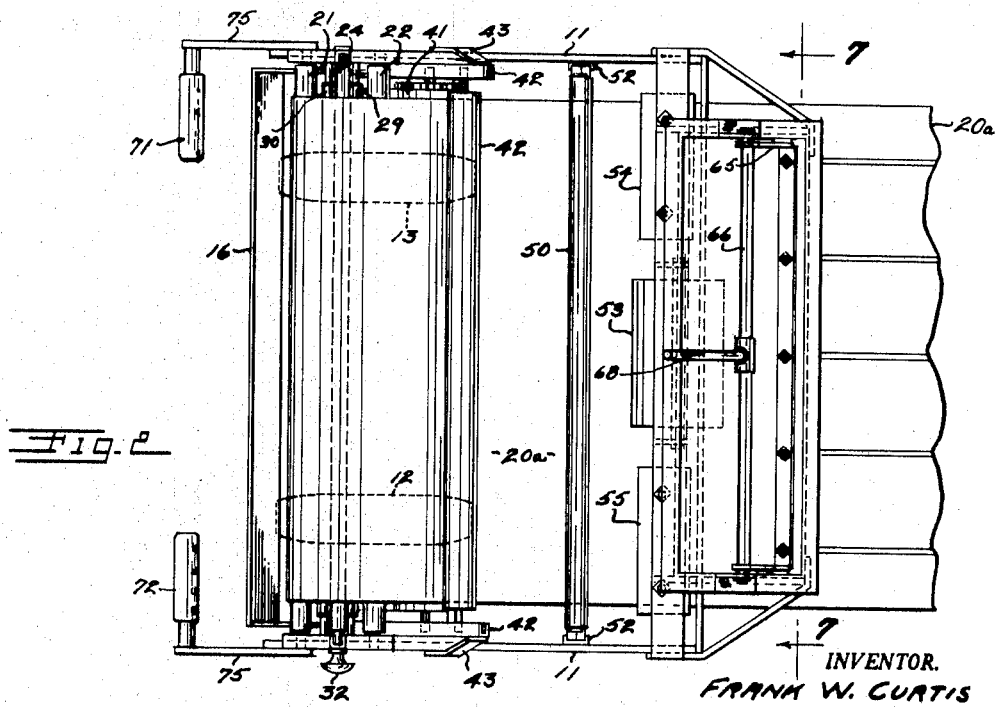
FIG. 2 is a top plan view of the embodiment shown in FIG. 1.
Figure 4:
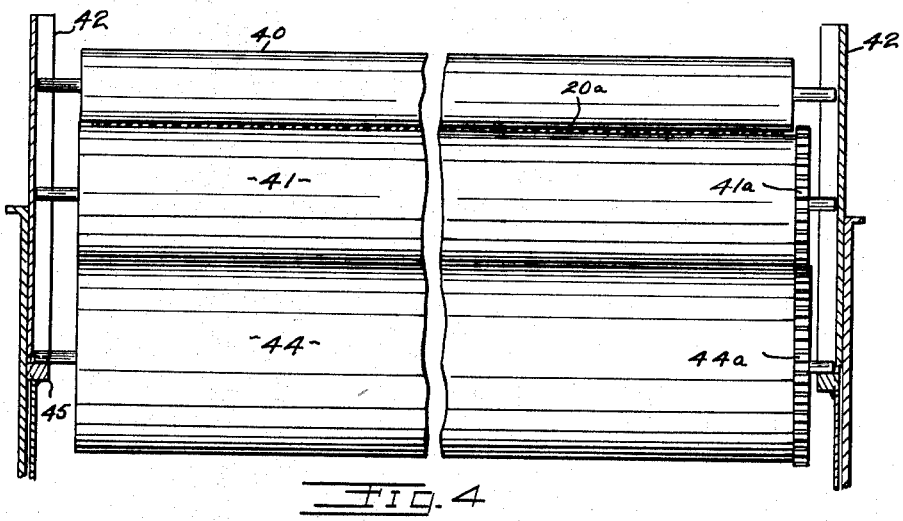
FIG. 4 is a transverse sectional line taken along the plane of line 4—4 of FIG. 1 and showing in detail the means for transferring the adhesive to the vapor barrier sheet material.
Figure 5:
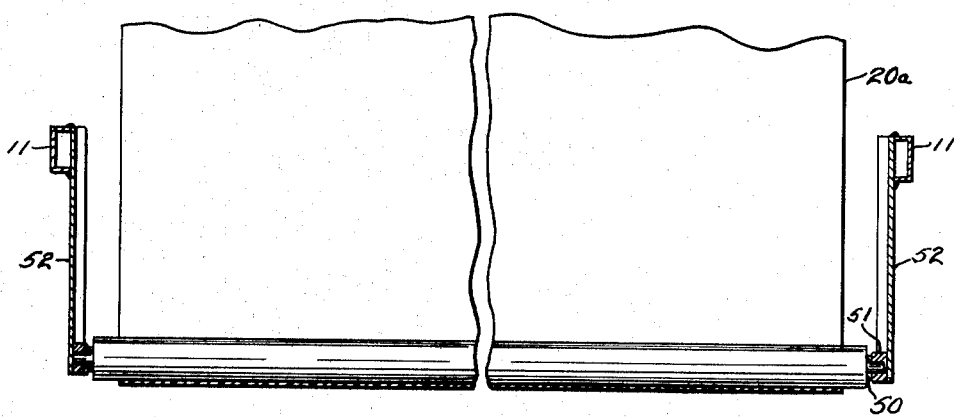
FIG. 5 is a vertical sectional view taken along the plane of line 5—5 of FIG. 1 and showing the guide roller located at the bottom of the apparatus shown in FIG. 1.
Figure 8:
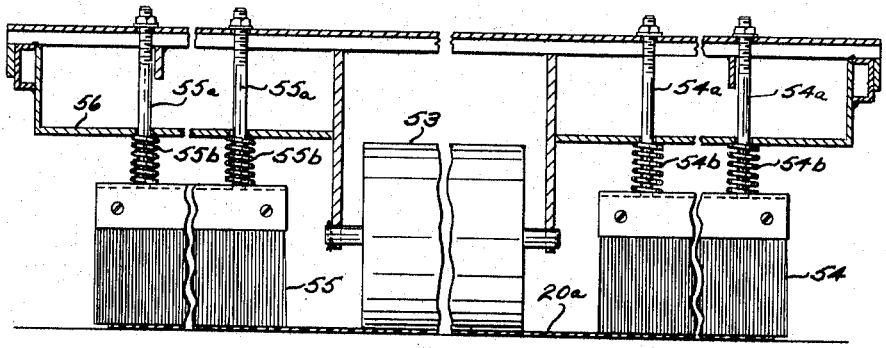

As seen in FIG. 1, the Koroseal vapor barrier sheet material is fed downwardly and travels between an idle roll 40 and a coating roll 41. The axles of both the idler roll and coating roll are rotatably supported between spaced U-shaped guide members 42. The U-shaped guide members 42 are secured to the vertically upstanding frame members 17 and 18 by means of outwardly projecting frame members 43. As seen in FIG. 4, the coating roll is in direct contact with the outer surface of a pick-up roll 44. The axle of the pick-up roll rests upon an outstanding flange member 45, as seen in FIG. 4, provided on the inner surface of the adhesive containing tray 16. It will be noted that the lower portion of the pick-up roll extends downwardly into the adhesive material contained in tray 16. In assembly, the pick-up roll 44 and its associated axle are first lowered into the adhesive-containing tray 16 in a manner wherein the distal ends of its axle are retained within the U-shaped guide members 42. The coating roll and idle roll are then assembled in the same manner whereby gravity forces them into frictional contact with one another. It will be noted that one end of the printing roll and pick-up rolls respectively are provided with gear portions 41a and 44a respectively. The purpose of such gear portions is to be sure the pick-up roll will be rotated as the vapor barrier sheet material is fed across the coating roll 41. As the vapor barrier sheet passes between the idle roll and coating roll 40 and 41 respectively, the underside becomes completely coated with adhesive material from coating roll 41. The sheet material 20a passes downwardly through the frame 11 beneath a guide roll 50 which has the distal ends of its axle 51 journalled for rotation in suitable bearings contained in depending frame members 52 which are rigidly secured to the frame 11, as seen in FIGS. 1, 2 and 5.

For the purpose of assuring a smooth application of the vapor barrier sheet material to the roof deck, a roller and brush assembly is secured to the rearward portion of the frame 11. A roller 53 is journalled for rotation intermediate a pair of upwardly projecting rods 54a and 55a respectively which are threaded at their upper ends to receive suitable nuts and washers. Each of the rods is provided with a coil spring 54b and 55b which is located between the upper surface of the brush proper and the lower surface of the frame member 56. The purpose of the coil springs is to provide a limited degree of resiliency to the action of the brushes as they travel across the upper surface of the vapor barrier sheet material so as to accommodate any irregularities in the roof surface. As seen in FIG. 6, the combined area of the two brushes 54 and 55 along with the roller 53 afford a substantial area across the surface of the vapor barrier sheet to force the sheet into smooth bonding engagement with the roof surface.

Figure 8:
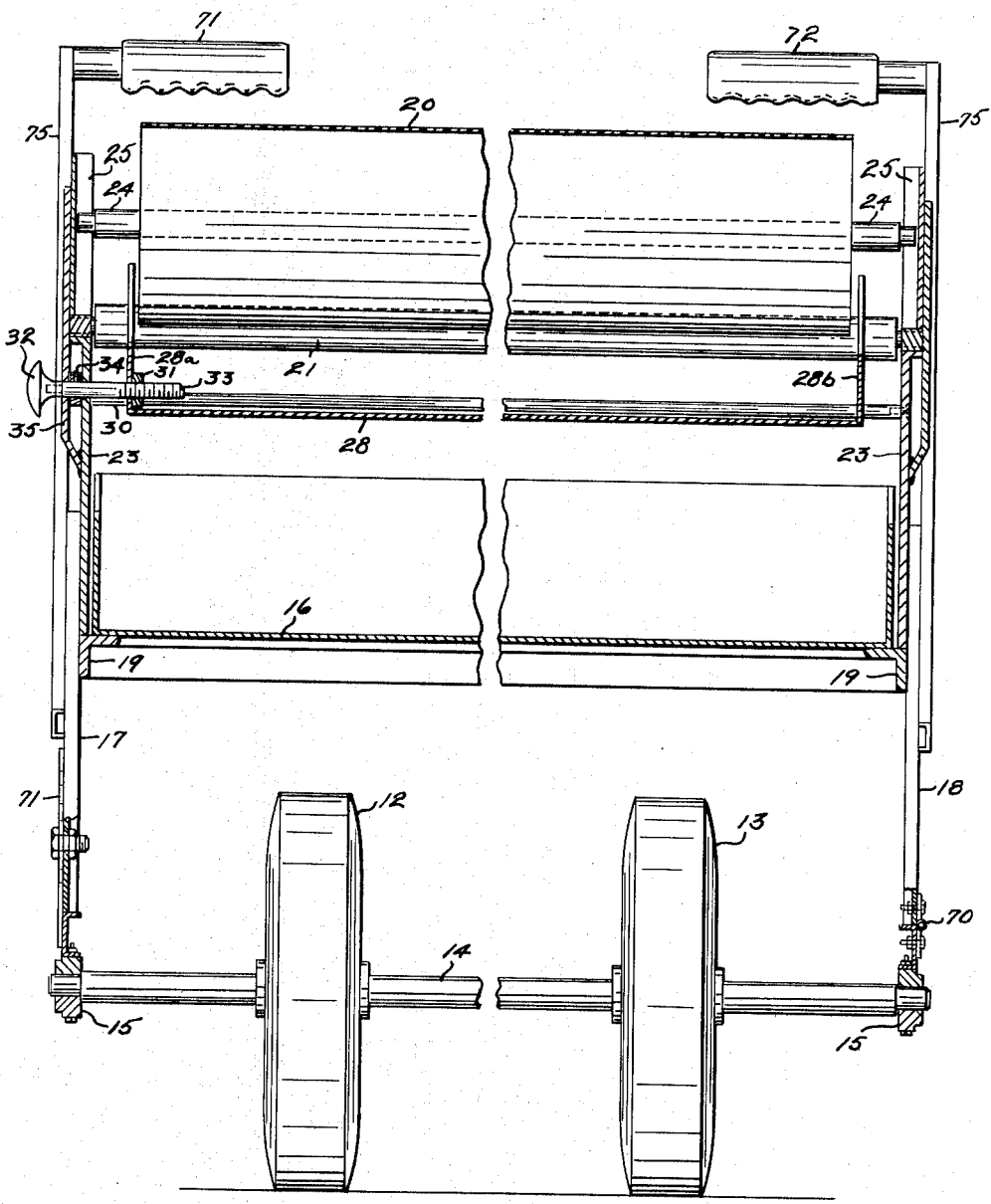
FIG. 8 is a transverse cross sectional enlarged view taken along the plane of line 8—8 of FIG. 7 showing the detail of the adhesive flow controlling mechanism embodied in the apparatus of FIG. 7.
Figure 7:
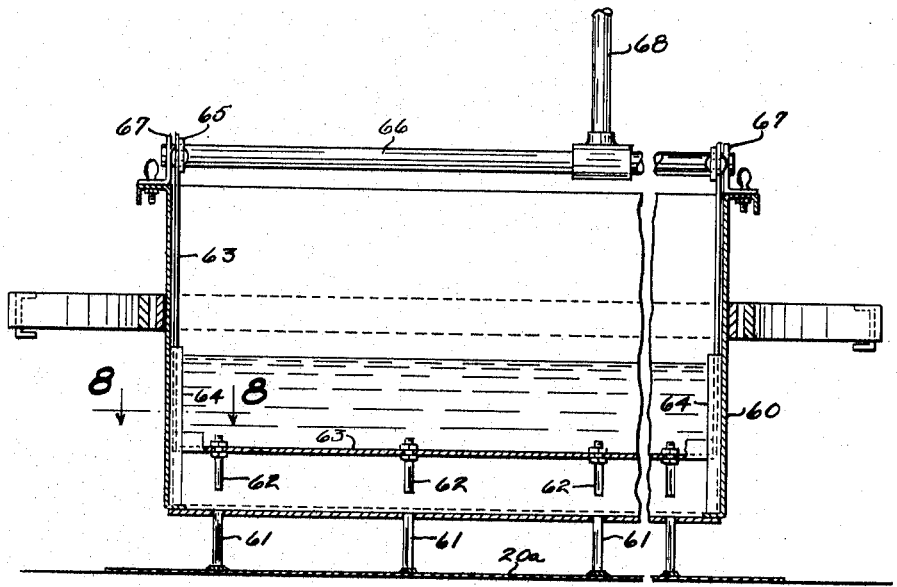
FIG. 7 is a vertical cross sectional view taken along the plane of line 7—7 of FIG. 2 and showing in detail the means for applying the adhesive to the top surface of the vapor barrier sheet material.
Figure 8:
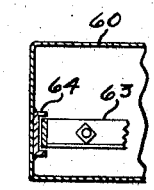

Means is provided at the rear end of the frame 11 for supplying spaced strips of adhesive material to the top surface of the vapor barrier sheet after it has been applied to the roof deck surface. Said means take the form of a hopper 60 which extends across the full width of the vapor barrier sheet and is rigidly secured by welding or other suitable means to the frame 11 adjacent its rearmost end or that portion, as seen to the right in FIG. 1. The bottom of the hopper 60 is provided with a plurality of aligned spaced openings 61 through which the adhesive material contained therein may flow in continuous streams, as seen in FIG. 7. A plurality of depending stud members 62, one for each of the openings 61, are secured to suitable control mechanism and control the flow of the adhesive through the openings 61. As seen in FIGS. 1, 2, 7 and 8, the control mechanism comprises a generally U-shaped member 63, the base portion of which is provided with the depending studs 62 while its upstanding arm portions are guided in a U-shaped channel member 64 which is secured to the inner surface of the end of the hopper 60, as seen in FIG. 8. The upper end of the arm portions are pivotally secured to connecting links 65 which are in turn rigidly secured to a transversely extending bar 66, as seen in FIGS. 2 and 7, which in turn is rigidly secured to the upper edge of the hopper 60 by means of suitable brackets 67 at each end thereof. A lever arm 68 is rigidly secured to the bar 66. Backward and forward movement of said arm causes the studs 62 to be raised and lowered with respect to the openings 61 by means of the control mechanism and thereby control the flow of adhesive through said openings. An additional novel feature of the present apparatus will be found in the structure of the pairs of vertically extending frame members 17 and 18. With reference to FIGS. 1 and 3, it will be noted that members 18 located on one side of the machine are provided with suitable hinges 70 while members 17 on the other side of the machine are provided with a plurality of vertically aligned apertures which are adapted to adjustably cooperate with upstanding members 71 which are rigidly secured at their lower ends to the frame 11. The purpose of this particular construction is to facilitate operation of the apparatus on slanted roofs. It will readily be appreciated that it is desirable to maintain the main body of the machine and particularly the tray 16, containing the adhesive fluids in a substantially level position at all times. Thus, even though the wheels 12 and 13 follow the contour of a slanted roof, the main body of the apparatus may be tilted through the facility of the spaced apertures in cooperating members 17 and 71 along one and the hinged members 70 provided on the other frame members 18 to maintain a substantially level position at all times.

A pair of handles 72 and 73 are provided for the purpose of pulling the apparatus manually in the direction of arrow 74, as seen in FIG. 1. The handles are secured to the vertically upright frame members 17 and 18 by means of outwardly projecting members 75.

The operation of the device should be apparent. The vapor barrier sheet material is fed from the roll 20 downwardly between the idle and coating rolls 40 and 41 respectively and receives an adhesive coating on its undersurface by means of the pick-up roll 44 which transfers the adhesive material from the tray 16 to the coating roll 41, thence onto the lower surface of the vapor barrier sheet material. After leaving the printing roll, the vapor barrier sheet passes under the guide roll 50 into contact with the roof surface where it is securely fastened under pressure subjected by the spaced brushes 54 and 55 and roller 53. Continuous spaced strips of adhesive material are continuously applied to the upper surface of the newly laid vapor barrier sheet material by means of the openings 61 in hopper 60. It will be understood, of course, that a continuous layer of adhesive which extends across the entire surface of the vapor barrier layer sheet could be applied by the hopper by arranging for a continuous slot in the bottom surface of hopper 60 in place of the spaced openings 61. Thus, in one easy application, the present apparatus applies and bonds a vapor barrier sheet to a roof deck, while simultaneously applying additional adhesive means to the upper surface of the vapor barrier sheet in preparation for the next layer of roofing material.

In FIGS. 9 through 12, I have shown another embodiment of the Koroseal vapor barrier sheet material and adhesive applicator. The applicator includes a carriage or frame member 90 which is substantially rectangular in shape and has its forward end turned upwardly and outwardly to form a suitable pulling handle 91. The frame is mounted for movement on a pair of wheels 92 and 93 which in turn are rotatably mounted on an axle 94 which has its distal ends journalled in bearing boxes 95 which are secured to each side of the frame 90.

A roll of Koroseal vapor barrier sheet material 95 is supported intermediate the front and rear ends of the frame 90 by means of a pair of spaced rollers 96 and 97 which extend transversely between the side members of the frame 90 and rotate as the vapor barrier sheet material is fed out. The roll of vapor barrier sheet material is rotatably mounted on a suitable axle 98 which has its distal ends retained within a pair of spaced vertically upright U-shaped guide members 99. Each of the U-shaped guide members is secured to a plate member 100 which has its lower end rigidly secured to the sides of the frame 90. The U-shaped guide members 99 permit the roll of vapor barrier material and its axle to rotate therein and move vertically downward as the roll becomes smaller but prevents the axle and its associated roll from moving horizontally.

Means is provided for laterally aligning the roll of vapor barrier material 95. Such means take the form of a substantially U-shaped member 101, as best seen in FIG. 10, which has a length somewhat greater than the overall length of the roll 95 and include spaced upstanding leg portions which project upwardly adjacent the ends of roll 95. A pair of spaced bars 102 and 103 slidably support the member 101. As seen in FIG. 10, the member 101 is provided with a threaded nut 104 which is rigidly secured in one end thereof. A control knob 105 having a threaded shaft 106 threadedly engages the nut and through rotation of the knob causes the member 101 to travel back and forth along the spaced bars 102 and 103 and thereby provided lateral adjustment for the member 101 which in turn positions the roll 95 in the desired location along its axis intermediate the frame 90. As seen in FIG. 10, the knob 105 and its associated shaft are trapped against horizontal displacement by means of an annular flange member 107 which is rigidly secured to the shaft 106 by means of a set screw and contained between the frame members 108 and 109 which depend from the lower edge of the frame member 90.

Means is provided above the roll 95 for supplying spaced ribbons of adhesive material to the bottom surface (or that surface which will engage the top of the roof deck) of the vapor barrier sheet. Such means take the form of a hopper 110 which is supported on a pair of inverted U-shaped frame members 111 and 112 having the lower ends of their inverted leg portions rigidly secured to the sides of the frame 90. The bottom of the hopper 110 is provided with a plurality of aligned spaced openings through which the adhesive material contained therein may flow in a continuous stream upon the sheet of vapor barrier material. A plurality of depending stud members 113, one for each of the spaced openings, are secured to control mechanism 114 which is identical to that described with regard to the embodiment disclosed in FIG. 1 and includes a lever arm 115 which upon backward and forward movement causes the studs to be raised and lowered in response to actuation of the control mechanism 114. The control mechanism 114 is guided between a pair of spaced U-shaped guide members 115 which are located on the inner surface of the hopper 110.

Figure 11:
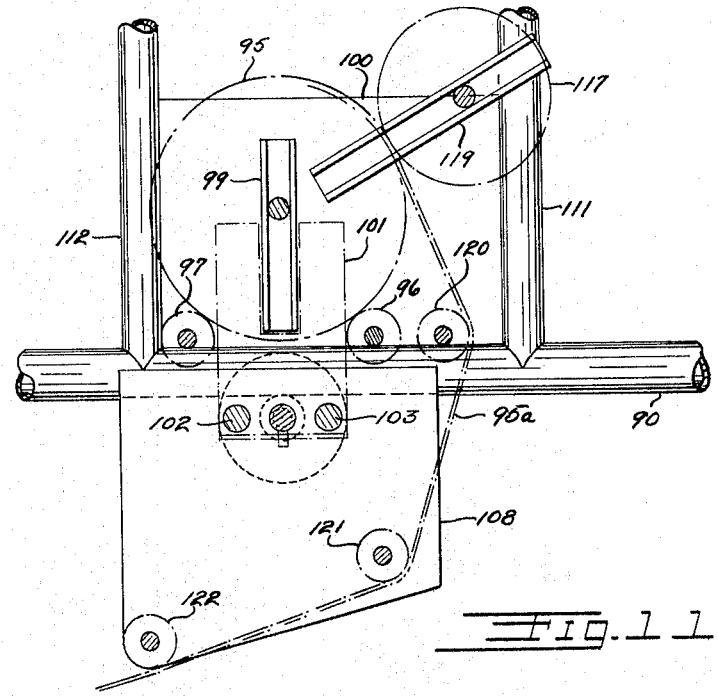
FIG. 11 is an enlarged fragmentary side elevational view of the structure of the embodiment disclosed in FIG. 9 relating to the support of the roll of vapor barrier sheet material.
Figure 12:
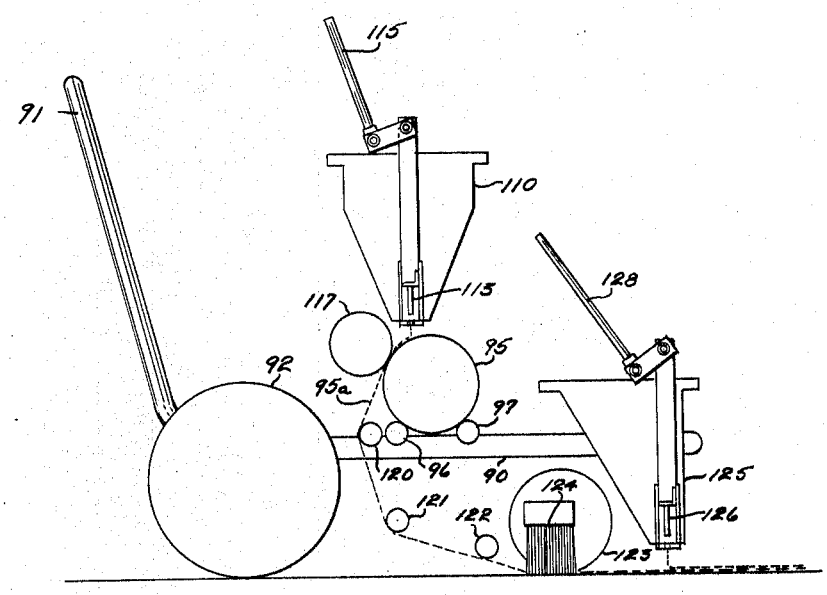
FIG. 12 is a diagrammatic side elevational view of the embodiment disclosed in FIG. 9.

An idle roll 117 is rotatably supported on an axle 118 which is rotatably supported between a pair of spaced U-shaped guide members 119 which in turn are rigidly secured at their upper end to inverted U-shaped frame member 111 and project diagonally downwardly in the general direction of the axis of the roll 95, as best seen in FIGS. 10 and 11. The purpose of the idle roll 117 is to maintain tension in the vapor barrier sheet and keep it taut as it is fed off of the roll 95. In addition, the idler roll smooths out the adhesive material which is applied to the surface of the roll of vapor barrier material at a point just above the tangential line contact of the idler roll with the roll 95.

The vapor barrier sheet material 95a is fed downwardly across a guide roll 120 which is rotatably mounted between the sides of frame 90, then beneath a pair of spaced guide rolls 121 and 122 which are rotatably mounted between the plate members 108, as seen in FIGS. 9 and 10. A roller and brush assembly is provided for the purpose of assuring smooth application of the vapor barrier sheet to the roof deck and is secured to the rear portion of the frame 90 and positioned so that the sheet material as it leaves the guide roller 122 travels beneath the roller and brush assembly and is thereby directly applied to the surface of the roof deck. The roller and brush assembly is identical to that described with regard to the embodiment of FIG. 1 and includes a roller 123 which is journalled for rotation intermediate a pair of brushes 124a and 124b which depend from the frame 90 and apply yielding pressure to the upper surface of the vapor barrier sheet 95a in its application to the roof deck.

Means is also provided at the rear of the frame or that portion to the right, as seen in FIG. 9, for supplying continuous spaced ribbons of adhesive material of the top surface of the vapor barrier sheet after it has been applied to the roof deck surface. Such means take the form of a hopper 125 which extends across the full width of the vapor barrier sheet and is rigidly secured to the frame 90. The bottom of the hopper 125 is provided with a plurality of aligned spaced openings through which adhesive material contained therein may flow in continuous streams or ribbons upon the top surface of the vapor barrier sheet. The flow of the adhesive material through the openings is controlled by a plurality of depending studs 126 which are connected to suitable control mechanism 127 which is identical to that described in connection with those of hoppers previously described. Backward and forward movement of the lever arm 128 causes the studs 126 to be raised and lowered with respect to the openings in the hopper and thereby controls the flow of the adhesive material therethrough. Again the openings in the bottom of the hopper may be so constructed as to provide a continuous film of adhesive which extends completely across the vapor barrier sheet.

The operation of the device disclosed in FIGS. 9 through 12 should now be apparent. With reference to the diagrammatic illustration shown in FIG. 12 it is noted that the vapor barrier sheet 95a is fed from the roll 95 downwardly across spaced guide rolls 120, 121 and 122 onto the roof surface where it is securely fastened under pressure subjected by the brush and roller assembly. Adhesive material is supplied by the hopper 110 directly upon the surface of the roll 95 prior to its engagement with the idle roll roller 117; the roller 117 has the effect of smoothing and flattening the layers or ribbons, whichever the case may be, of adhesive material upon the sheet material and also maintains the vapor barrier sheet taut during its application. Continuous ribbons of adhesive material are then applied to the upper surface of the newly laid vapor layer sheet material by means of hopper 125 in preparation for the next layer of roofing material. It will be, of course, understood that the hoppers 110 and 125 may supply either a plurality of spaced continuous ribbons of adhesive material or one continuous sheet of adhesive material across the surface of the vapor barrier sheet.

Figure 13:
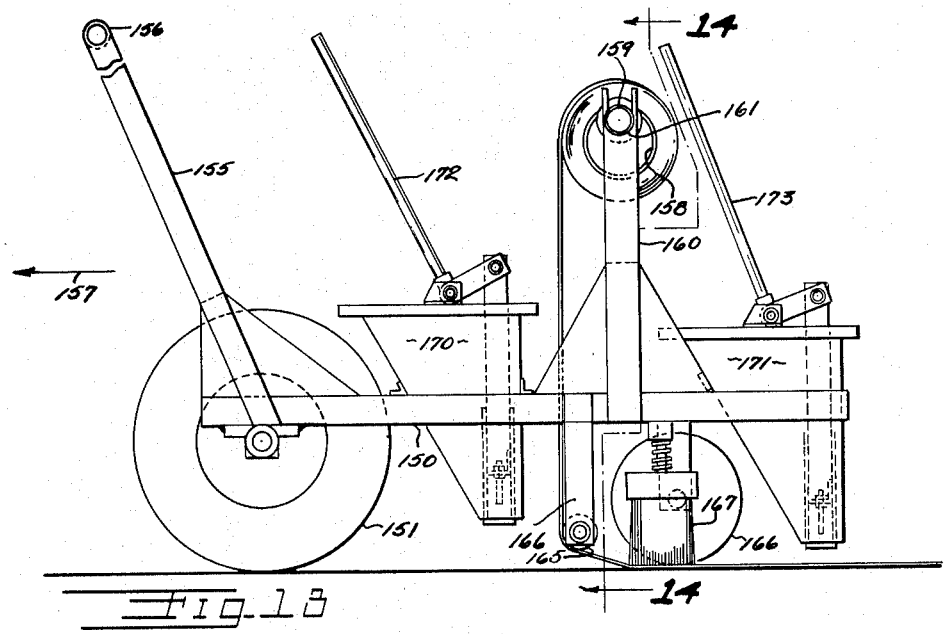
FIG. 13 is a side elevational view of still another embodiment of the present invention.
Figure 14:
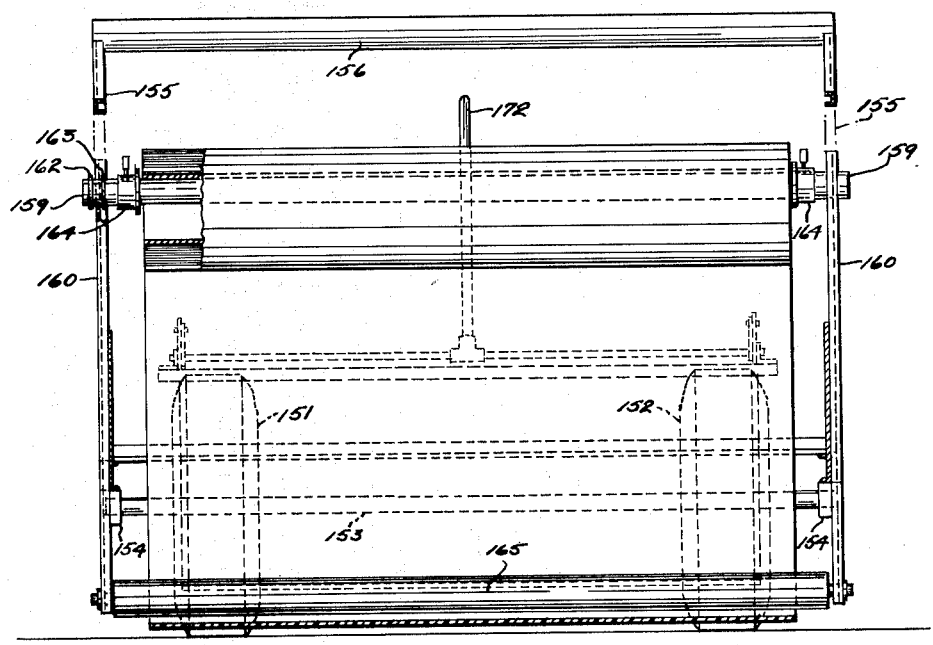
FIG. 14 is a vertical cross sectional view taken along the plane of line 14—14 of FIG. 13 having parts broken away to more clearly show the construction.

In FIGS. 13 and 14 I have shown still another modification of my novel Koroseal vapor barrier sheet material and adhesive applicator. The machine shown therein comprises a rectangular horizontal frame member 150 which is mounted for movement on a pair of wheels 151 and 152. The wheels are mounted for rotation with an axle 153 which is journalled in suitable bearing boxes 154 attached to the side members of the frame 150. A pair of upwardly and outwardly extending structural members 155 are connected by means of a handlebar 156 and provide means for manually pulling the apparatus in the direction of the arrow 157, as seen in FIG. 13.

In the present embodiment, the vapor barrier sheet material is wound about an enlarged hollow tubular central core member 158. The core member 158 has an inner diameter substantially greater than the diameter of a supporting rod 159 which is carried above the frame 150 by means of a pair of spaced vertically extending frame members 160 which are rigidly secured at their base to the frame 150. The upper ends of the frame members 160 are provided with U-shaped recesses 161 and are adapted to receive the outer ends of the rod 159. As seen in FIG. 14, the rod 159 has a length somewhat greater than the transverse width of the spacing between the upstanding frame members 160 and is provided at its left end, as seen in FIG. 14, with a pair of spaced, permanently secured flange members 162 and 163 which lie adjacent each side of the associated upstanding frame member 160 and prevent the rod 159 from sliding axially and thereby becoming dislodged from the members 160. A pair of adjustable collars 164 provided with suitable set screws are adapted to slide along the rod 159 and position the core of vapor barrier material at the desired lateral location with respect to the frame of the machine.

In the novel construction, the center of the core 158 is offset from the center of the rod 159 in a manner so that the major portion of the core 158 lies below the center of the rod 159. Through this construction, it will be readily understood that the vapor barrier sheet material as it is fed downwardly to pass under the guide roll 165, as seen in FIG. 14, remains taut at all times, due to the fact that as the material unwinds from the core, resistance is constantly offered by the greater weight of the core of the material being disposed below the center of the rod 159.

Guide roll 165 is rotatably supported on a pair of spaced depending frame members 166 which are attached to the sides of frame 150. As the vapor barrier sheet material passes beneath the guide roller 165 it is engaged by a roller and brush assembly having a construction identical to that with reference to the embodiment shown in FIGS. 1 and 9. The roller 166 is journalled for rotation intermediate of a pair of brushes 167 and is secured in any suitable fashion to the bottom of the frame 150 in a zone located substantially beneath the roll of vapor barrier sheet material on core 158.

The applicator of the present embodiment contains a pair of spaced hoppers 170 and 171. The first of said hoppers 170 is located substantially intermediate the front support wheels and the core of vapor barrier material 158. The second hopper 171 is located at the rear of the machine, or that portion as seen to the right in FIG. 13, and is rigidly secured to the frame by any suitable means. The construction of the individual hoppers 170 and 171 is identical with those previously disclosed with regard to FIGS. 1 and 9. However, their location is somewhat different from that of the previous embodiments and particularly is this true with reference to hopper 170. Hopper 170 is provided with a plurality of spaced aligned openings in its bottom surface, instead of being deposited on the vapor barrier sheet material itself. The lever arm 172 is associated with suitable control mechanism which is identical to that disclosed in connection with the hoppers in FIGS. 1 and 9 and provides means whereby the flow of the adhesive is controlled. Hopper 171, located at the rear of the machine, is constructed identical to hopper 170 and its purpose is to supply a plurality of continuous spaced ribbons of adhesive material upon the upper surface of the vapor barrier sheet material after it has been smoothly applied to the roof deck by the roller and brush assembly. The flow from the hopper 171 is controlled by a lever 173 which is connected to a control mechanism which is identical to that heretofore described.

In operation, as the machine travels in the direction of the arrow 157, a plurality of spaced continuous ribbons of adhesive material or one continuous sheet of adhesive material is applied by hopper 170 directly to the roof surface. Immediately thereafter and before the adhesive has had time to set, the vapor barrier sheet material is fed downwardly from the core 158 and forced into bonding engagement with the roof surface through the media of the roller and brush assembly. The hopper 171, located at the rear of the machine, supplies the upper surface of the already laid vapor barrier sheet material with a plurality of continuous ribbons or one continuous sheet of adhesive material in preparation for the application of the next layer of roofing material.

Figure 15:
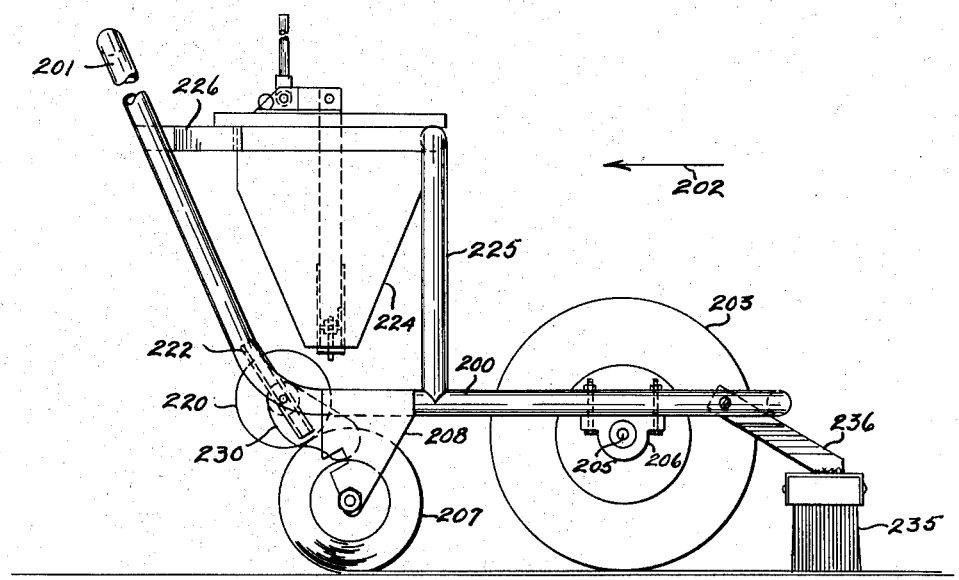
FIG. 15 is a side elevational view of a further embodiment of the present invention wherein the roll of vapor barrier sheet material is supported directly upon the surface to be covered.
Figure 16:
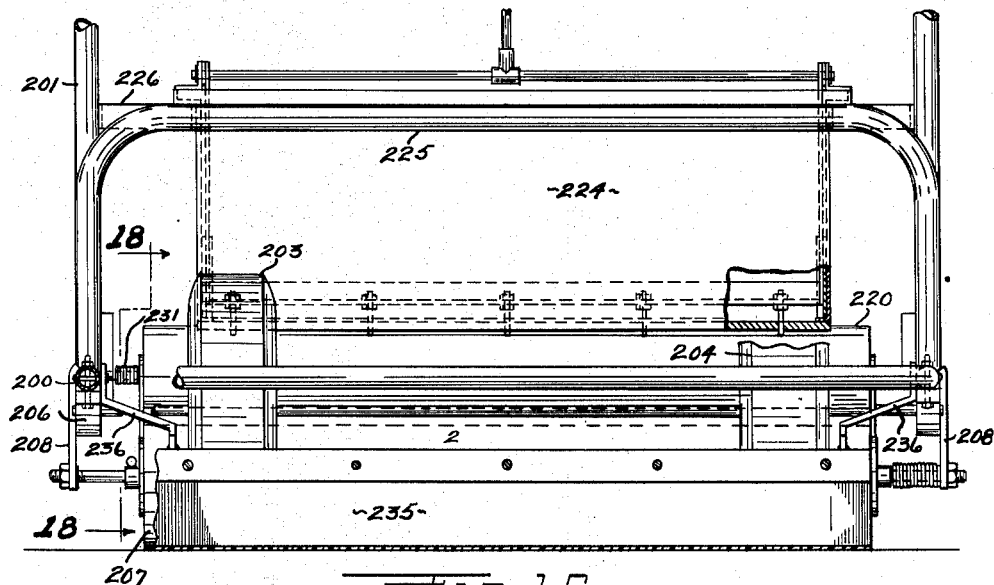
FIG. 16 is an end elevational view of the embodiment disclosed in FIG. 15 with parts broken away to more clearly show the construction.
Figure 17:
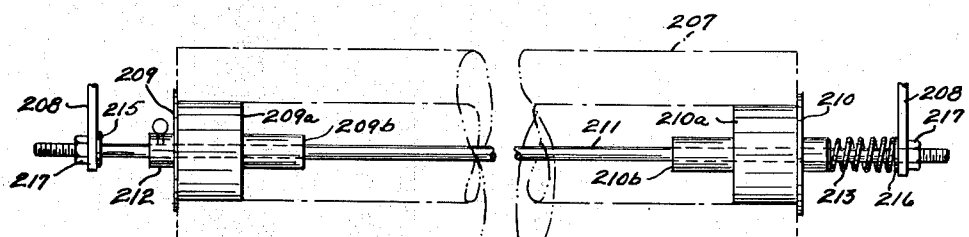
FIG. 17 is an enlarged fragmentary detail view of the means for supporting the roll of vapor barrier sheet material used in connection with the embodiment disclosed in FIG. 15.

In FIGS. 15 through 20 I have shown a further embodiment of the present invention. Here, the Koroseal vapor barrier sheet material and adhesive applicator comprises a substantially rectangular horizontal base frame member 200 which has its front end thereof turned upwardly to form a handle 201 by which the machine may be manually pulled in the direction of arrow 202. The frame 200 is mounted for movement on a pair of spaced rotatable wheels 203 and 204 which are in turn mounted on an axle 205 which has its distal ends journalled in bearing boxes 206 which are secured to the side members of the frame 200. The wheels are located somewhat closer to the rear of the machine than they are to the front, as clearly seen in FIG. 15. A roll of vapor barrier sheet material 207 is supported by suitable means between a pair of depending flange plates 208 which are secured to the side members of the frame 200 substantially adjacent the front end of the machine. It will be noted in FIGS. 15 and 16 that the roll of barrier material rests directly upon the roof surface. With reference to FIG. 17, the hollow core of vapor barrier material is supplied with suitable end discs 209 and 210 having an enlarged portion 209a and 210a which contacts the inner surface of the core of vapor barrier material and a smaller portion 209b and 210b provided with an inside diameter which is just slightly larger than that of a supporting axle 211. A removable collar 212 having a set screw is provided to locate the left end of the roll of vapor barrier material as seen in FIG. 17. The outer surface of the disc 209 abuts the adjustable collar 212 and limits its movement to the left, as seen in FIG. 17. A coil spring 213 is provided at the right end of the core of vapor barrier material and abuts a spacer 214 to resiliently urge the entire roll of vapor barrier material into contact with the adjustable collar 212 and thereby maintain its selected position. It will be understood that the disc portion 209b and 210b and the bores provided therethrough supply bearings upon which the roll of vapor barrier material rotates about the axle 211 in its laterally adjusted position. The axle 211 is provided with a fixed washer 215 which is welded or otherwise permanently secured to the axle at its left end, as viewed in FIG. 17. The depending frame plates 208 are provided with suitable apertures to receive the free ends of the axle 211. To achieve the assembled position shown in FIG. 17 the right end of the axle is first inserted into the frame plate 208 to a point wherein the left end of the axle terminates short of the inner surface of its associated frame plate 208. The left free end of the axle may then be inserted into the aperture of its associated frame plate 208 to the point wherein permanently secured washer 215 abuts the frame plate 208, as seen in FIG. 17. A suitable removable washer 216 and the coil spring 213 are, of course, first inserted on the right end prior to its assembly. Retaining nuts 217 are then secured to both ends of the axle 211 and maintain it in the position shown in FIG. 17.

An idle roller 220 is secured in tangential line contact with the roll of vapor barrier material 207 at a point slightly above and to the left of the roll of vapor barrier, as seen in FIG. 15. The idle roller 220 is supported on its own axle 221; the distal ends of which are supported between a pair of spaced U-shaped guide members 222 and are secured to the inner surface of the frame member 200 and disposed in the direction of the axle of the roll of vapor barrier material, as seen in FIG. 15. The U-shaped guide members 222 permit the idle roll and its associated axle to rotate therein and move along the path defined by the U-shaped guide member but prevent the axle and its associated idle roll from moving horizontally or in any other direction. Since the guide members are disposed in the direction of the roll of vapor barrier material, the idle roll due to gravity is always maintained in contact with the roll of vapor barrier material. It will be noted in FIG. 20 that the idler roll has a length substantially equal to that of the roll of vapor barrier 207.

An adhesive material containing hopper 224 is disposed above the roll of vapor barrier material and is supported in such position by means of vertically extending frame members 225 and horizontally extending frame members 226, as seen in FIG. 15. The bottom of the hopper is provided with a plurality of spaced aligned openings and the flow therethrough is controlled by suitable control mechanisms identical to that heretofore described in connection with the embodiments disclosed in FIGS. 1 and 9. The adhesive material contained in the hopper may be applied to the roll of vapor barrier material in continuous ribbons or in a continuous sheet which extends entirely across the width of the roll of vapor barrier material.

Figures 18, 19:
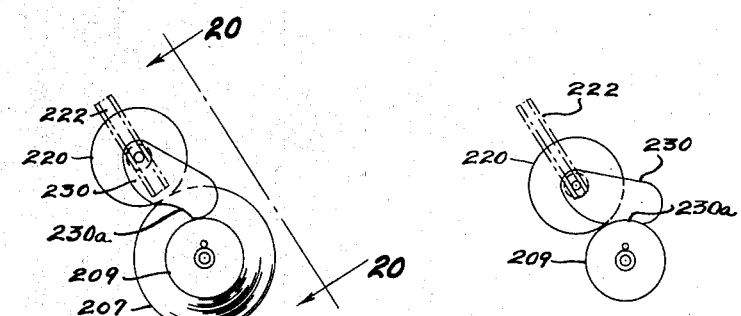
FIG. 18 is a vertical cross sectional view taken along the plane of line 18—18 of FIG. 16, showing the details of the means for preventing adhesive from running over the ends of the roll of vapor barrier sheet material.
FIG. 19 is a view similar to FIG. 18 but showing the roll of vapor barrier sheet material substantially empty with the corresponding movement effected by the members as seen in FIG. 18.
Figure 20:
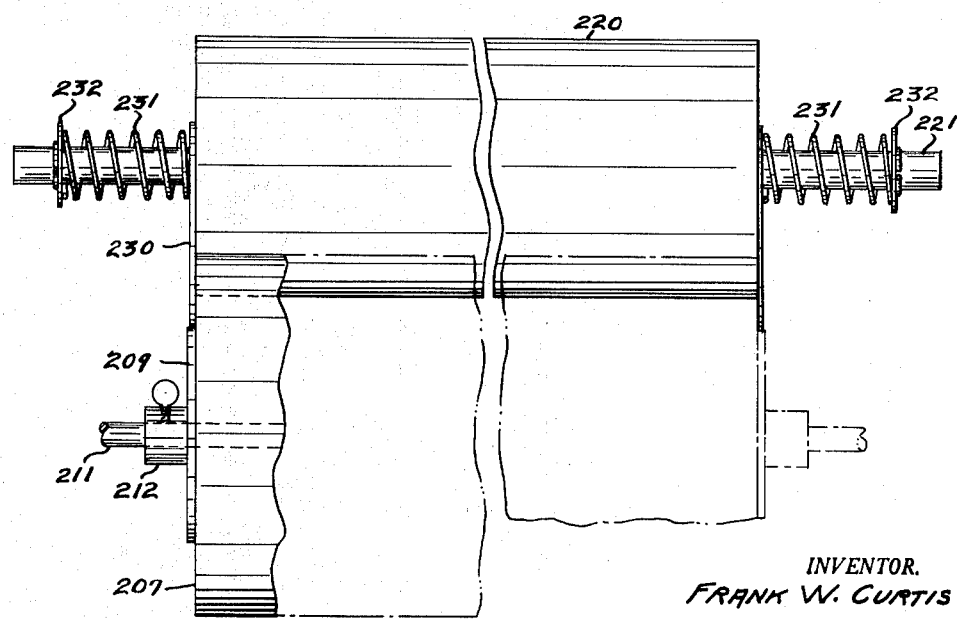
FIG. 20 is an enlarged view taken along the plane of line 20—20 of FIG. 18 showing the details of the construction of the components disclosed in FIG. 18.

Means are provided to prevent the adhesive material from running over the ends of the roll of Koroseal vapor material and these means take the form of elongated plates 230. The plates 230 are secured to the axle 221 of the idle roller 220. As seen in FIGS. 15, 16 and 20, a coil spring 231 is provided at each end of the axle 221 and has one of its ends abutting a fixed flange member 232 while its other end resiliently urges the elongated plate 230 against the ends of the idle roller 220, as seen in FIG. 20. With reference to FIG. 18, it will be seen that when a full roll of vapor barrier material is being utilized, the elongated plates 230 take the position wherein one end abuts the disc 209 and 210 of the roll of vapor barrier material and covers a substantial portion of the outer peripheral area of the roll of vapor barrier material in the area wherein the adhesive material is most likely to spill over the edges. As the roll 207 becomes smaller in diameter due to the material being removed therefrom and deposited upon a roof deck, the elongated plates 230 assume the position, shown in FIG. 19, wherein a hollow concave recess portion 230a provided in the outer edge of the plate members 230 rides in close conformity with the discs 209 and 210 so as to at all times provide protection over a substantial portion of the outer periphery of the remaining roll of vapor barrier material and prevent the adhesive from running over the edges of the roll.

Means is provided at the rear of the frame 200 for smoothing out the vapor barrier material after it has been laid on the roof deck so as to effect a secure bond between the roof deck and the Koroseal vapor barrier material. These means take the form of an elongated brush 235 having a width substantially equal to or slightly greater than the sheet of Koroseal vapor barrier material. These means take the form of an elongated brush 235 having a width substantially equal to or slightly greater than the sheet of Koroseal vapor barrier material. The brush is pivotally secured at its ends by means of suitable bracket members 236 to the frame 200. Thus, even though the front end of the machine is slightly lowered as the roll 207 becomes smaller, so as to cause the rear portion of the machine to be raised about the pivotal point, created by the axle 205 of the wheels, the brush remains in contact with the upper surface of the vapor barrier sheet material due to its own weight holding it in such position, since it is free to pivot at its point of connection with the frame 200. In the present embodiment, the main wheels 203 and 204 also facilitate the rolling of the Koroseal vapor barrier sheet upon the roof deck.

Figure 21:
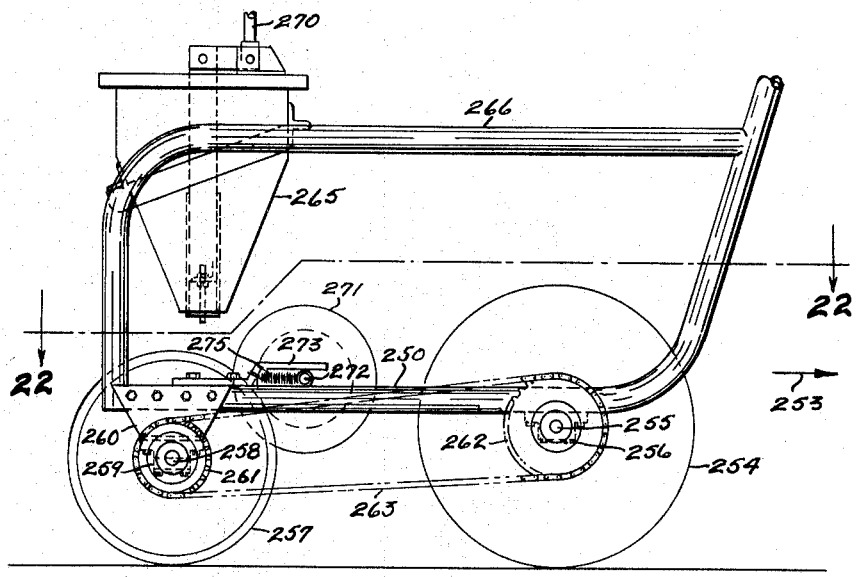
FIG. 21 is a side elevational view of still another embodiment of the present invention.
Figure 22:
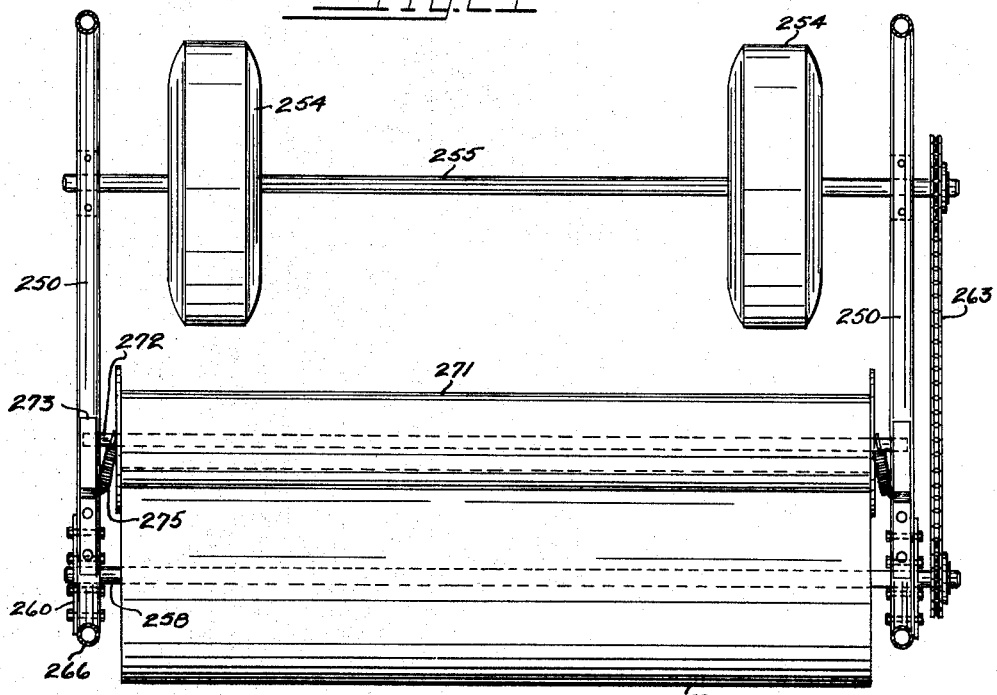
FIG. 22 is a transverse cross sectional view taken along the plane of line 22—22 of FIG. 21.

Referring now to FIGS. 21 and 22 wherein I have shown suitable apparatus for applying adhesive coatings to roof constructions. Here the applicator includes a carriage or frame member 250 which is turned upwardly at its forward end, as seen to the right in FIG. 21. The turned up portion then extends transversely across the apparatus to form a handle (not shown) by which the machine may be pulled in the direction of arrow 253, as seen in FIG. 21. At its foremost end, the frame is supported by a pair of spaced wheels 254 which are rotatably secured to an axle 255 which is in itself journalled for rotation in suitable bearing boxes 256 secured to the side members of frame 250. The rear end of the machine, as seen to the left in FIG. 21, is provided with a roller 257 which extends transversely across substantially the entire width of the machine, as seen in FIG. 22. The roller is secured to an axle 258 which has its ends journalled for rotation in suitable bearing boxes 259 provided at the lower end of support plates 260. The support plates are secured to the sides of the frame 250 and depend therefrom, as clearly seen in FIG. 21. One of the outer ends of the wheel supporting axle 255 and the roller supporting axle 258 are provided with suitable sprocket gears 261 and 262 respectively to which a continuous chain 263 is connected. Thus, the wheels 254 and the roller 257 are connected in driving engagement by means of the continuous chain 263 and sprocket gears 261 and 262.

An adhesive containing hopper 265 is secured by frame members 266 above the roller 257. The bottom of the hopper is provided with suitable spaced openings for allowing a continuous ribbon of adhesive material to flow directly upon the outer surface of the roller 257. Control means identical to those described with regard to the hoppers of the previous embodiments of the present invention are provided and are controlled by a suitable lever 270, as heretofore fully described. For the purpose of providing a smooth and even coating of adhesive material upon the roller member 257, an idle roller 271 is provided. The idle roller is supported for rotation on axle 272 which has its ends freely inserted between a space formed by bracket member 273 secured to the top of the frame 250 at one end and having its other end offset therefrom, as seen in FIG. 21. A coil spring 275 is attached to each end of the axle 272 in the space between the end of the idle roller and frame 250, as seen in FIG. 22 and has its other end secured to the bracket 273 between the offset portion and that portion which is connected to the frame. The spring is normally maintained under tension so as to maintain a steady friction between the idle roller 271 and the main roller 257.

In view of the foregoing description, taken in conjunction with the accompanying drawings, it is believed that a clear understanding of the construction, operation and advantages of the various embodiments of the device as disclosed herein will be quite apparent to those skilled in this art.

What is claimed is:

Surfacing apparatus for applying sheet material and adhesive to a pitched surface to be covered comprising in combination a base frame, pairs of upright frame members adjustably attached to said base frame, means for supporting a roll of sheet material between said frame members, an open adhesive reservoir supported in a horizontal plane on said frame members, a coating roll mounted on said frame members and in contact with the lower surface of said sheet material, a transfer roll in communication with said adhesive reservoir for transferring adhesive contained in said reservoir to said coating roll, an idler roll mounted between said frame members and in pressure engagement with the outer surface of said sheet material directly opposite said coating roll, means operatively engageable with said roll of sheet material and adjustable relative to said frame members for laterally aligning said roll of sheet material therebetween, guide means on said base frame for directing said sheet material toward the pitched surface to be covered, a brush and roller assembly mounted on said base frame extending therebelow and operable to apply pressure to the top surface of said sheet material as the latter engages said surface to be covered, means for movably adjusting said frame members relative to said base frame effective to tilt said base frame at an angle corresponding to the pitch of said surface to be covered, said relative adjustment being such as to retain said reservoir in said horizontal plane, and a hopper provided on said base frame with suitable discharge outlets for effecting discharge of continuous spaced ribbons of adhesive on the outer surface of that portion of said sheet material which has already been supplied to said surface to be covered.

References Cited by the Examiner
UNITED STATES PATENTS

| | | | |
|---|---|---|---|
| 1,846,145 | 2/1932 | Robinson | 156—575 |
| 2,373,239 | 4/1945 | Fenn | 156—575 |
| 2,500,583 | 3/1950 | Smith | 156—575 |
| 2,503,560 | 4/1950 | Moyer | 156—575 |
| 3,122,862 | 3/1964 | Figge | 156—575 XR |

EARL M. BERGERT, *Primary Examiner.*